United States Patent
Le Naour et al.

(10) Patent No.: US 9,380,527 B2
(45) Date of Patent: Jun. 28, 2016

(54) METHOD FOR REDUCING THE ENERGY CONSUMPTION IN A WIRELESS COMMUNICATION TERMINAL AND COMMUNICATION TERMINAL IMPLEMENTING SAID METHOD

(71) Applicant: Thomson Licensing, Issy de Moulineaux (FR)

(72) Inventors: Jean-Yves Le Naour, Cesson-Sevigne (FR); Ali Louzir, Cesson-Sevigne (FR); Dominique Lo Hine Tong, Cesson-Sevigne (FR); Jacques Perraudeau, Betton (FR); Denis Bernard, Cesson Sevigne (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/680,100

(22) Filed: Nov. 18, 2012

(65) Prior Publication Data
US 2013/0128783 A1 May 23, 2013

(51) Int. Cl.
*H04W 52/02* (2009.01)

(52) U.S. Cl.
CPC .......... *H04W 52/02* (2013.01); *H04W 52/0251* (2013.01); *H04W 52/0274* (2013.01); *Y02B 60/50* (2013.01)

(58) Field of Classification Search
CPC .................. H04W 52/0251; H04W 52/02
USPC .............. 455/73, 500; 370/277, 281
See application file for complete search history.

(56) References Cited

U.S. PATENT DOCUMENTS

| | | | |
|---|---|---|---|
| 6,982,614 B2* | 1/2006 | Humphrey | 333/174 |
| 7,868,700 B2 | 1/2011 | Elia | |
| 2003/0162513 A1 | 8/2003 | Saruwatari et al. | |
| 2005/0002421 A1* | 1/2005 | Ito et al. | 370/474 |
| 2006/0013176 A1* | 1/2006 | De Vos et al. | 370/338 |
| 2007/0291672 A1 | 12/2007 | Kochman et al. | |
| 2008/0205509 A1 | 8/2008 | Le Naour et al. | |
| 2010/0278100 A1* | 11/2010 | West et al. | 370/328 |
| 2010/0283575 A1* | 11/2010 | Tubb et al. | 340/5.1 |
| 2010/0285762 A1 | 11/2010 | Ko et al. | |

(Continued)

FOREIGN PATENT DOCUMENTS

| | | |
|---|---|---|
| EP | 1448003 | 8/2004 |
| EP | 1901564 | 3/2008 |

(Continued)

OTHER PUBLICATIONS

McCune E: "Advanced architectures for high-efficiency multi-mode, multi-band terminal power amplifiers", Radio and Wireless Conference, 2004 IEEE Atlanta, GA, USA Sep. 19-22.

(Continued)

*Primary Examiner* — Brandon Renner
(74) *Attorney, Agent, or Firm* — Tutunjian & Bitetto, P.A.

(57) ABSTRACT

The invention relates to a wireless communication terminal able to transmit and/or receive video, audio or data signals in a first and a second frequency band comprising a first MIMO circuit of N paths (N≥1) operating in the first frequency band and a second MIMO circuit of M paths (M≥1) operating in the second frequency band, the first and second MIMO circuits each being coupled to front-end modules comprising respectively N and M power amplifiers, the front-end modules being connected to an antenna system.

14 Claims, 3 Drawing Sheets

(56) References Cited

U.S. PATENT DOCUMENTS

| | | | |
|---|---|---|---|
| 2011/0002414 A1 | 1/2011 | Coldrey et al. | |
| 2011/0122829 A1* | 5/2011 | Zetterman et al. | 370/329 |
| 2011/0300885 A1* | 12/2011 | Darabi et al. | 455/500 |
| 2012/0120998 A1* | 5/2012 | Fakhrai et al. | 375/224 |
| 2012/0154038 A1* | 6/2012 | Kim et al. | 330/149 |
| 2012/0188889 A1* | 7/2012 | Sambhwani et al. | 370/252 |
| 2012/0282875 A1* | 11/2012 | Park et al. | 455/404.1 |
| 2012/0287887 A1* | 11/2012 | Jung et al. | 370/329 |
| 2013/0084915 A1* | 4/2013 | Asuri et al. | 455/552.1 |

FOREIGN PATENT DOCUMENTS

| | | |
|---|---|---|
| FR | 2911739 | 7/2008 |
| JP | 2003284093 | 10/2003 |
| JP | 201074514 | 4/2010 |

OTHER PUBLICATIONS

Gosse K et al: "Accepted from open call—The evolution of 5 GHz WLAN toward higher throughputs", IEEE Personal Communications, IEEE Communications Society, US.

Hamid Rafati et al. "A receiver architecture for dual-antenna systems", IEEE Journal of Solid-State Circuits, IEEE Service Center, Piscataway, NJ, USA.

French Search Reprot dated Jul. 12, 2012.

Kim et al., "A Theoretical Treatment of PA Power Optimization in Clipped MIMO-OFDM Systems", 2009 IEEE Global Telecommunications Conference, Nov. 30, 2009, Honolulu, Hawaii, USA, pp. 1-6.

He et al., "Power Consumption Minimization for MIMO Systems—A Cognitive Radio Approach", IEEE Journal on Selected Areas in Communications, vol. 29, No. 2, Feb. 2011, pp. 469-479.

Huang et al., "A Highly Integrated Dual Band SiGe BiCMOS Power Amplifier That Simplifies Dual-band WLAN and MIMO Front-end Circuit Designs", 2010 IEEE/MTT-S International Microwave Symposium, May 23, 2010, Anaheim, California, USA, pp. 256-259.

IEEE Standard 802.11a-1999—"Part 11: Wireless LAN Medium Access Control (MAC) and Physical Layer (PHY) specifications: High-speed Physical Layer in the 5 GHz Band", Dec. 1999, pp. 1-90.

IEEE Standard 802.11b-1999 (R2003)—"Part 11: wireless LAN Medium Access Control (MAC) and Physical Layer (PHY) specifications: Higher-speed Physical Layer Extension in the 2.4 GHz Band", Jun. 12, 2003, pp. 1-96.

IEEE Standard 802.11gTM-2003—"Part 11: wireless LAN Medium Access Control (MAC) and Physical Layer (PHY) specifications: Amendment 4: Further Higher Data Rate Extension in the 2.4 GHz Band", Jun. 27, 2003, pp. 1-78.

IEEE Standard 802.11nTM-2009—"Part 11: wireless LAN Medium Access Control (MAC) and Physical Layer (PHY) specifications: Amendment 5: Enhancements for Higher Throughput", Oct. 29, 2009, pp. 1-536.

* cited by examiner

METHOD FOR REDUCING THE ENERGY CONSUMPTION IN A WIRELESS COMMUNICATION TERMINAL AND COMMUNICATION TERMINAL IMPLEMENTING SAID METHOD

This application claims the benefit, under 35 U.S.C. §119 of FR Patent Application 1160526, filed 18 Nov. 2011.

DOMAIN OF THE INVENTION

The present invention relates mainly to a method for reducing energy consumption in a wireless communication terminal, more specifically a terminal for the broadband transmission of signals such as video, audio or data signals in a domestic environment.

The present invention applies more specifically in the framework of terminals operating according to the standard IEEE 802.11n and simultaneously employing several frequency channels.

TECHNOLOGICAL BACKGROUND

WiFi technology in accordance with the standard IEEE 802.11a/b/g or 11n is currently the most used technology for broadband wireless transmission in a domestic environment.

The standard IEEE 802.11n provides some improvements with respect to IEEE 802.11a/b/g standards. Notably this last authorises the use of MIMO (Multiple Input Multiple Output) technology which is a multi-antenna technique enabling improvement of the bitrate of transmissions and of their robustness in an environment, such as the domestic environment, that is dominated by interferences.

The standard IEEE 802.11n operates in the band 2.4 to 2.5 GHz and the band between 4.9 to 5.9 GHz. These two bands are called the 2.4 GHz band and the 5 GHz band in the remainder of the description. Currently communication terminals exist that operate simultaneously in both of these bands. For example, a terminal of this type is described in the French patent n° 2 911 739, in the name of THOMSOM Licensing.

A wireless communication terminal operating in the 2.4 GHz and 5 GHz bands is thus able to simultaneously receive and/or transmit a signal in the 2.4 GHz band and a signal in the 5 GHz band. In general, the 5 GHz band is used for the transmission of video and the 2.4 GHz band is used for the transmission of data.

To be able to function simultaneously in the 5 GHz band and in the 2.4 GHz band, the communication terminal solutions typically retained are constituted of front-end modules (FEM) associated with separate antennas and interfaces via RF circuits to the baseband digital circuit operating in the corresponding frequency bands.

As is known, the front-end modules comprise power amplifiers to amplify the signals to be transmitted.

In standard systems, there is one power amplifier per transmission path. However, power amplifiers use a lot of energy. In addition, the modulations implemented in systems using MIMO technology require power amplifiers with very good linearity, which translates as poor efficiency.

However the proliferation of the number of user terminals requires that the energy consumption of these terminals is optimised. Currently, the main techniques implemented to reduce the consumption of user terminals are either using standby or the reduction of energy emitted and radiated via the antennas by reduction of the radio frequency power at the input of the power amplifiers. However, the power amplifier functioning in class A, its polarisation point is not modified and the power dissipated by the components remains high whatever the power of the signal at input. To overcome these problems, various solutions have been proposed and notably that described in the patent application US2003/0162513 A1.

SUMMARY OF THE INVENTION

Consequently, the purpose of the present invention is to propose a new method for reducing the energy consumption in a wireless communication terminal that enables the power consumed by said terminal to be dynamically reduced according to terminal operating conditions such as the environment, the required bitrate and the service quality.

Thus, the present invention proposes a method for reduction of the energy consumption in a wireless communication terminal able to simultaneously transmit and/or receive video, audio or data signals in at least a first and a second frequency bands comprising a first circuit of N paths with $N \geq 1$, operating in the first frequency band and a second circuit of M paths with $M \geq 1$ operating in the second frequency band, the first and second circuits each being coupled to front-end modules comprising respectively N and M power amplifiers, the front-end modules being connected to an antenna system, said method being characterized in that it comprises the following steps for:

extracting signals transmitted and/or received from control data, if there is no conflict and according to extracted control data, transmitting the signals of one of the first or second frequency bands via a power amplifier of the front-end module of the other frequency band and disconnecting the power amplifier of the front-end module of the frequency band of said signals.

According to an embodiment, the control data are selected from among data on the power transmitted or TPC (Transmit Power Control) and/or data on the quality of services QoS (Quality of Services). Moreover, the first frequency band is the 5 GHz frequency band and the second frequency band is the 2.4 GHz frequency band. According to an embodiment, at least one of the amplifiers of the front-end module receiving signals of two frequency bands is a broadband amplifier able to cover the two bands 2.4 and 5 GHz. Preferably, the circuits of N or M paths are MIMO circuits with several inputs and several outputs.

According to another characteristic of the present invention, the signals of one of the first or second frequency bands pass via a power amplifier of the front-end module of the other frequency band and the power amplifier of the front-end module of the frequency band of said signals is disconnected, if there is no conflict or if the power amplifier has a sufficient bandwidth.

According to another characteristic of the present invention, the signals of the 2.4 GHz frequency band are transmitted via at least one of the power amplifiers of the front-end module of the 5 GHz band.

The present invention also relates to a wireless communication terminal able to transmit and/or receive video, audio or data signals in a first and a second frequency band comprising a first circuit of N paths with $N \geq 1$ operating in the first frequency band and a second circuit of M paths with $M \geq 1$ operating in the second frequency band, the first and second circuits each being coupled to front-end modules comprising respectively N and M power amplifiers, the front-end modules being connected to an antenna system, characterized in that it comprises:

means for extracting signals emitted and/or received from control data, means, during the emission of a burst in the first frequency band and of a burst in the second frequency band, to compare the transmission instants in order to detect or not a conflict, and if there is no conflict and according to extracted control data, means for transmitting the signals of one of the first or second frequency bands via a power amplifier of the front-end module of the other frequency band and for disconnecting the power amplifier of the front-end module of the frequency band of said signals.

According to an embodiment, said means comprise a command circuit connected at input to the first and second circuits to receive and process the control data, the command circuit output controlling the M if M<N or N if N<M switching circuits for which the inputs are connected to one of the M paths of the second circuit and for which an output is connected to one of the M power amplifiers, the other output being connected to one of the N power amplifiers via a summation circuit for which the other input is connected to one of the N paths of the first circuit.

Thus, to limit the consumption of the user terminal, an attempt is made to dynamically minimise the number of amplifiers implemented by using wideband power amplifiers that are able to cover the two bands 2.4 and 5 GHz, preferably using one amplifier per band.

BRIEF DESCRIPTION OF THE FIGURES

Other characteristics and advantages of the present invention will appear more clearly upon reading the detailed description that follows, this description being realized with reference to the enclosed drawings, wherein.

DETAILED DESCRIPTION OF AT LEAST ONE EMBODIMENT

Figure 1:
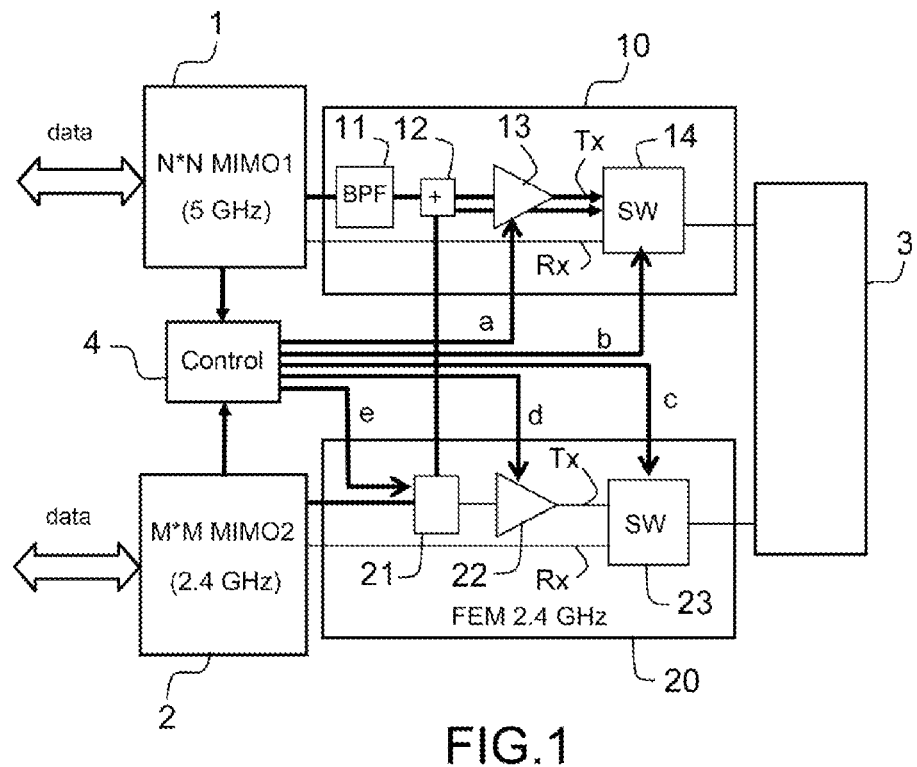
FIG. 1 is a block diagram of a communication terminal in accordance with the present invention.

In FIG. 1, are shown in block form, a wireless communication terminal able to simultaneously emit and/or receive video, audio or data signals in the 2.4 GHz band and the 5 GHz band.

The present invention will be described referring to terminals comprising MIMO circuits with multiple inputs and multiple outputs, but it is evident to those skilled in the art that it can apply to SISO circuits with a single input and a single output or to any equivalent circuit.

More specifically, the terminal comprises a MIMO circuit 1. The MIMO circuit 1 is an N×N circuit, that is to say it comprises N input terminals to receive MIMO signals and N output terminals to transmit MIMO signals in the 5 GHz band (with N≥1).

The N×N MIMO signals are transmitted and/or received via a front-end module 10 to or from an antenna system 3. In FIG. 1 only a transmission channel of the front-end module is shown. The transmission channel of the front-end module 10 shown comprises a filter 11 for which the output is connected to a summer 12 for which the role will be explained hereafter. The summer output is connected to the input of a power amplifier 13 that, in the embodiment shown, is a wideband amplifier. This amplifier is activated by a signal from a control circuit 4 for which the role is explained hereafter. The output of the amplifier 13 is connected to a switching circuit 14 itself connected to the antenna system 3 that can be constituted by a wideband or dual-band multi-access, omni-directional or sector-based antenna system Moreover, the switching circuit enables the connection of the antenna system in transmission mode (TX) or in reception mode (RX).

The communication terminal also comprises a second MIMO circuit 2 for the 2.4 GHz band, the MIMO circuit comprising M×M transmission/reception paths or channels. Thus, the MIMO circuit 2 comprises M input terminals to receive MIMO signals and M output terminals to transmit MIMO signals (with M≥1, N and M being able to be equal or different).

The M terminals are connected to a front-end module 20 for which each transmission/reception amplification channel comprises, as shown in FIG. 1, a switching circuit 21, a power amplifier 22 connected at the output of the switching circuit 21 and controlled via a signal from the control circuit and a switching circuit 23 enabling switching between the transmission TX and reception RX paths.

As shown in FIG. 1, the control circuit 4 receives signals from the MIMO circuit 1 and the MIMO circuit 2 and transmits control signals respectively to the switching circuit 21, the power amplifiers 13 and 22 of each amplification channel of 5 GHz and 2.4 GHZ front-end modules and to switching circuits 14 and 23.

In accordance with the invention, the control circuit 4 dynamically receives from two MIMO circuits 1 and 2, information to control the front-end modules 10 and 20 respectively corresponding to the 5 GHz and 2.4 GHz amplification channels.

As shown in FIG. 1, a first output a of the circuit 4 is connected to the power amplifier 13 in a way to activate or disable it. The second output b is connected to the Tx/Rx (transmission/reception) switch 14 of the wideband front-end module 10. The third output c is connected to the Tx/Rx switch 23 of the 2.4 GHz transmission channel. The output d is connected to the power amplifier 22 of the module 20 to activate or disable it and the output e is connected to the switching circuit 21 in order to enable the transmission of the 2.4 GHz signal in the same channel as the 5 GHz signal via a summer 12.

Thus with the control circuit 4, two operating modes, namely a normal operating mode and a reduced power operating mode are managed, as will be explained in a more detailed manner hereafter.

The method for reduction of power consumption in accordance with the present invention will be described now with reference more specifically to FIG. 4.

Figure 4:
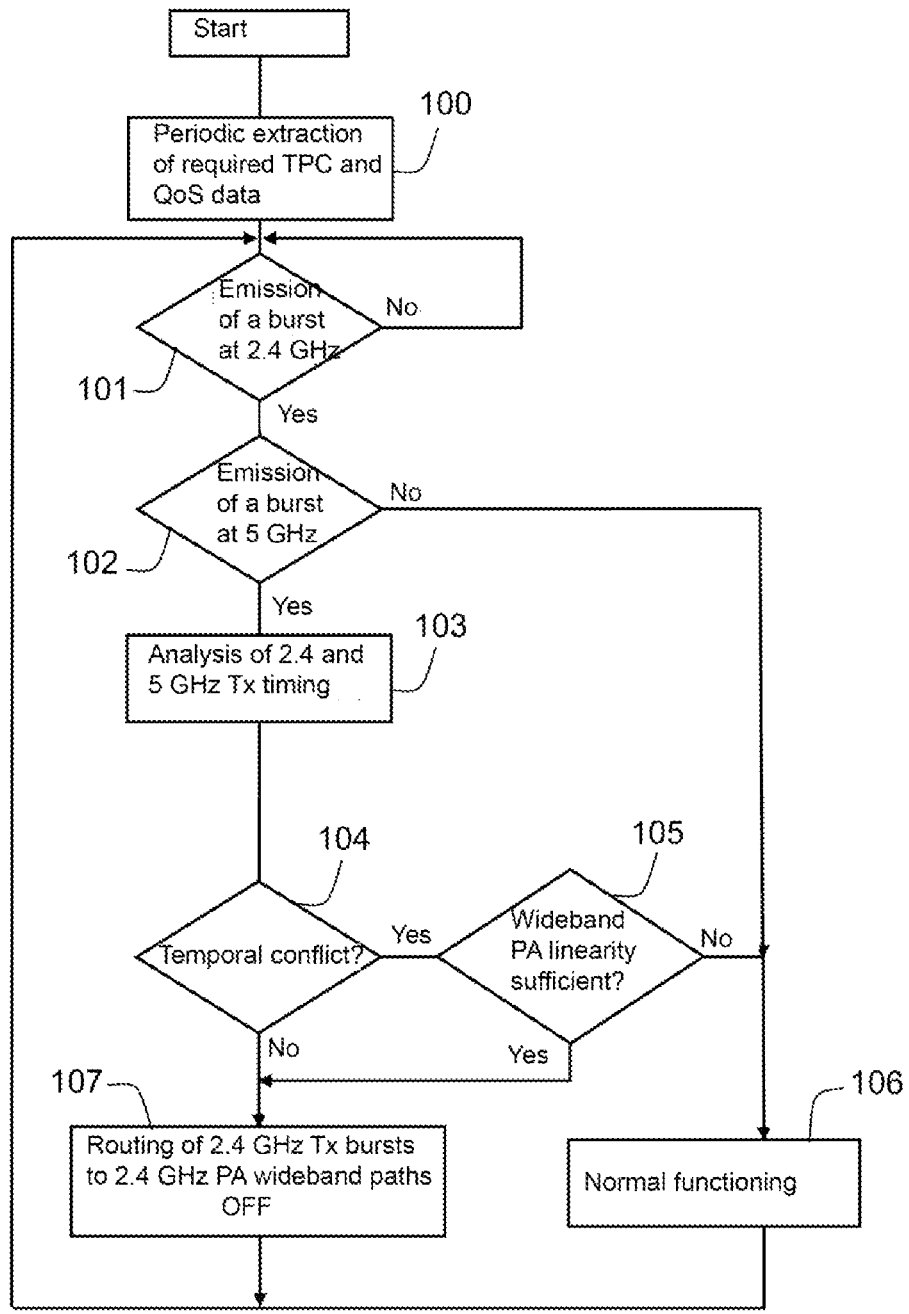
FIG. 4 is a flow chart explaining the method in accordance with the present invention.

As shown in the functional flowchart of FIG. 4 describing a basic process, the process begins by periodic extraction in 100, of data that, in the embodiment described, are TPC (Transmit Power Control) data and QoS (Quality of Service) data.

Figure 2:
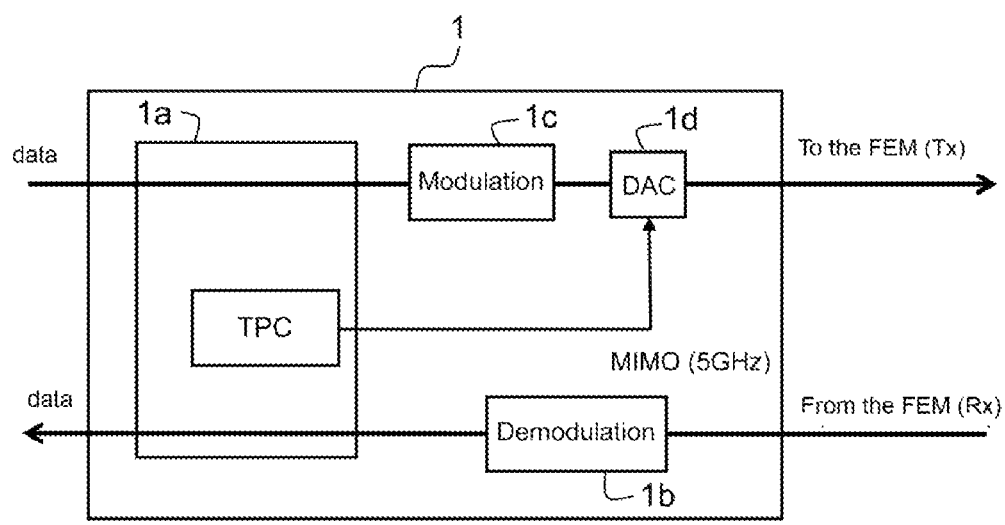
FIG. 2 is a more detailed diagram of the 5 GHz MIMO circuit.

The TPC data are obtained from the MIMO circuit itself. In FIG. 2, the MIMO circuit 1 operating in the 5 GHz band is diagrammatically shown. The MIMO circuit for the 2.4 GHz band has the same basic structure apart from the TPC data analysis. The MIMO circuit 1 thus comprises in 1*a* a signal processor that is used to send a temporal signal representative of the 2.4 GHz transmission to the control circuit 4 of FIG. 1. Moreover, the MIMO circuit 1 comprises in 1*c* a modulation circuit followed in 1*d* by an analogue digital converter enabling data to be sent via the transmission channel of the front-end module (Tx). Likewise, the signal processor 1a is connected to a demodulation circuit 1b that is itself connected to the front-end module to receive signals from the reception channel (Rx) of the front-end module.

In a manner known to those skilled in the art, the TPC frames are obtained by connecting an access point to a station (STA) via wireless connection according to a particular modulation and coding scheme, generally called MCS (Modulation Coding Scheme). The station periodically sends an item of information on the power transmitted (TPC) to the access point. Using this information, according to the distance between the access point and the station and the propagation conditions, the power of the output required for the access point can be calculated.

Moreover, the quality of service (QoS) is defined by the access point according to the type of data to be transmitted, namely data or video for example. Thus, the video signals are transmitted in a standard way via the 5 GHz MIMO circuit and priority is given to the processing of 5 GHz channels. The analysis of operational timing is carried out by the control circuit 4.

In the second step of the method for the reduction of power consumption in accordance with the present invention, there is a check in 101 to see if there was the transmission of a burst at 2.4 GHz, that is to say if there are signals to transmit via the 2.4 GHz front-end module. If the response is negative, the operation starts again in 101. If the response is positive, the 5 GHz burst transmission is studied in 102. If the response is negative, it passes to normal operation, as shown in the box 106. If the response is positive, the circuit 4 analyses the transmission timing between the 2.4 GHz signals and the 5 GHz signals in 103. In 104 it is determined whether a temporal conflict exists, that is if the signals must be transmitted at the same time or not. If the signals are not transmitted at the same time, the signals to be transmitted from the MIMO circuit at 2.4 GHz are routed in 107 to the 5 GHz signals front-end module that has transmission channels comprising wideband amplifiers that can transmit the signals at 2.4 GHz and the power amplifiers 22 of the 2.4 GHz front-end module are put into a non-operational state.

In the case of temporal conflict and according to a particular embodiment, the linearity of wideband power amplifiers of the 5 GHz front-end module 10 is examined in 105 to determine if it is sufficient. In the case of a negative response, the circuit remains in normal operation (106). In the case of a positive response, the signals transmitted at 2.4 GHz are routed to the 5 GHz front-end module 10 (107). It is evident to those skilled in the art, that this control step of wideband power amplifiers of the front-end module 10 is optional.

Thus the control circuit 4 decides on an optimal operating mode of the terminal (or access point (AP)) according to two possible operating modes, that are a normal operating mode (2.4 GHz and 5 GHz) in which the two front-end modules 10 and 20 of FIG. 1 are used simultaneously, an operating mode with reduction of the power consumed using only the wideband front-end module 10 to transmit and receive both the 5 GHz signals and the 2.4 GHz signals, either in simultaneous transmission when the power amplifiers have a sufficient bandwidth, or in time sharing.

For a simultaneous transmission and for a given bandwidth depending on the class and efficiency of the power amplifier, if the power transmitted is less than a limit defined at terminal level, the signal transmitted at 2.4 GHz can be added at input of the wideband transmission channel of the 5 GHz front-end module. Consequently, the power amplifiers of the front-end module at 2.4 GHz are disabled, reducing the power consumption of the system.

Figure 3:
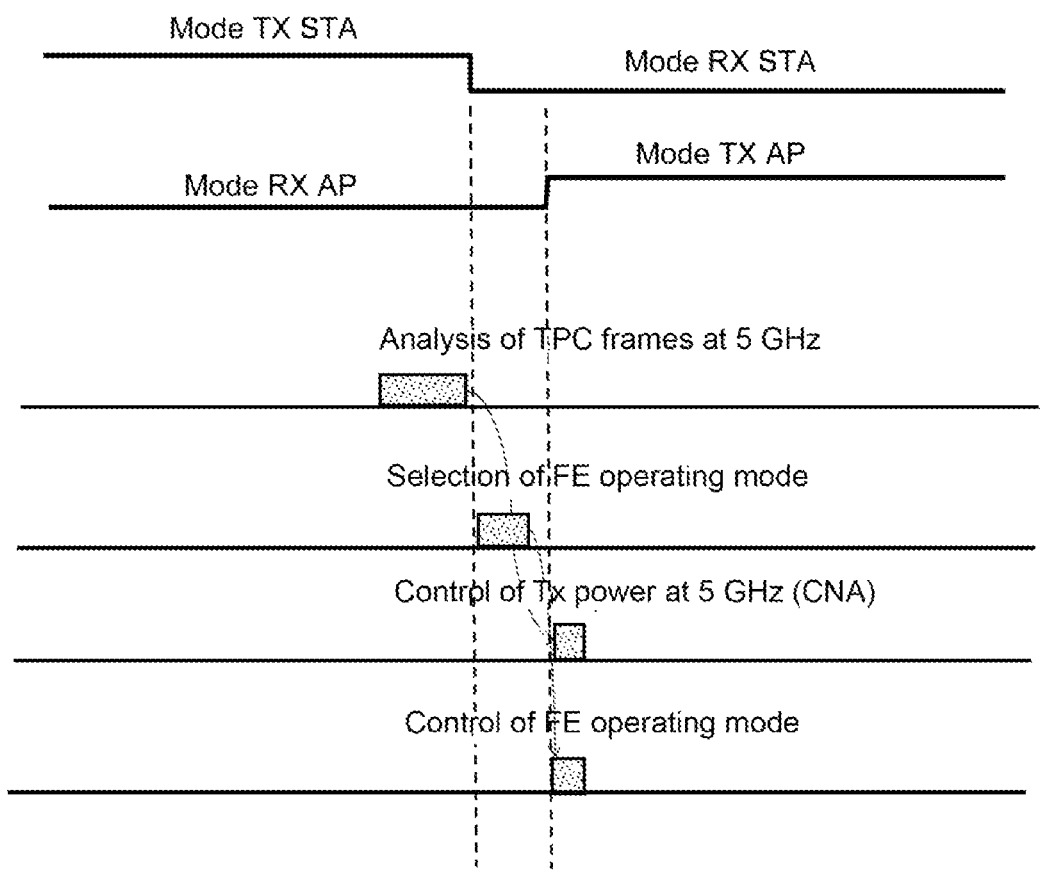
FIG. 3 shows according to time, the timing of the TPC command and the selection of the operational mode.

For a transmission in shared time at 5/2.4 GHz, the control circuit 4 manages the operating modes in order to limit the power consumption of the system. FIG. 3 diagrammatically shows, according to time, the order in which the different operations are carried out to control the front-end modules. Thus at the start, the access point (AP) is connected by wireless connection to a station (STA) and the terminal decodes the TPC information received from the station and thus controls the output power of the MIMO circuit at 5 GHz with the analogue/digital converter. Then, the control circuit calculates the optimal configuration enabling the functioning of wideband transmission channels and, if possible, the mix of 2.4 GHz signals to transmit via the wideband front-end module.

The present invention was described in reference to MIMO circuits with an identical number of input-output terminals. It can be applied to MIMO circuits with a different number for the input-output terminals (N×N' and/or M×M'). Moreover, N and M can be identical or different.

If N=M, in this case the solution is optimal in terms of cost and power consumption, as it only implements N power amplifiers.

If N<M, some power amplifiers of the 2.4 GHz MIMO circuit can be connected to the front-end module of 5 GHz channels to reduce the power consumption.

What is claimed is:

1. A method for reducing energy consumption in a wireless communication terminal able to simultaneously transmit signals in at least a first frequency band and a second frequency band, said method comprising:

extracting control data for signals to be transmitted, for transmission of a first burst of signals in a first frequency band and of a second burst of signals in a second frequency band, comparing transmission instants of the first and second bursts in order to detect whether or not there is a temporal conflict between the transmission instants, and, in the case where there is no temporal conflict and according to the extracted control data, routing the signals of one of the first or second frequency bands from a respective first or second circuit via a summer to a power amplifier of a front-end module of the other circuit of the other frequency band and disconnecting the power amplifier of the front-end module of the circuit of the frequency band of said signals;

in the case where there is temporal conflict, verifying the linearity of the power amplifier to determine whether or not to route the signals of the one of the first or second frequency bands from the respective first or second circuit via the summer to the power amplifier of the front-end module of the other circuit of the other frequency band.

2. The method according to claim 1, wherein the signals of one of the first or second frequency bands pass via the power amplifier of the front-end module of the other frequency band and the power amplifier of the front-end module of the frequency band of said signals is disconnected, if there is no conflict or if the power amplifier has a sufficient bandwidth.

3. The method according to claim 1, wherein the control data are selected from among data on the power transmitted or TPC (Transmit Power Control) or data on the quality of services QoS (Quality of Services).

4. The method according to claim 1, wherein the first frequency band is a 5 Gigahertz (GHz) frequency band and the second frequency band is a 2.4 GHz frequency band.

5. The method according to claim 1, wherein the signals of a 2.4 Gigahertz (GHz) frequency band are transmitted via at least one of the power amplifiers of the front-end module of a 5 GHz frequency band.

6. The method according to claim 1, wherein the first and second circuits are Multiple Input Multiple Output (MIMO) circuits.

7. A wireless communication terminal able to simultaneously transmit video, audio or data signals in a first frequency band and a second frequency band, the wireless terminal comprising:
 a signal processor configured to extract control data for signals to be transmitted, and
 a control circuit configured to:
  transmit a first burst of signals in the first frequency band and of a second burst of signals in the second frequency band,
  compare transmission instants of the first and second bursts in order to detect whether or not there is a temporal conflict between the transmission instants,
  in the case where there is no temporal conflict and according to extracted control data, route the signals of one of the first or second frequency bands from a respective first or second circuit via a summer to a power amplifier of a front-end module of the other circuit of the other frequency band and disconnecting the power amplifier of the front-end module of the frequency band of said signals and
  in the case where the is temporal conflict to verify the linearity of the power amplifier to determine whether or not to route the signals of the one of the first or second frequency bands from the respective first or second circuit via the summer to the power amplifier of the front-end module of the other circuit of the other frequency band.

8. The wireless communication terminal according to claim 7, wherein inputs of the control circuit are connected to first and second Multiple Input Multiple Output (MIMO) circuits to receive and process the control data,
 wherein the first circuit includes N paths with N≥1 operating in the first frequency band and the second circuit includes M paths with M≥1 operating in the second frequency band,
 the control circuit output controlling M if M<N or N if N<M switching circuits for which the inputs are connected to one of the M paths of the second MIMO circuit and for which an output is connected to one of the M power amplifiers, the other output being connected to one of the N power amplifiers via a summation circuit for which the other input is connected to one of the N paths of the MIMO circuit.

9. The wireless communication terminal according to claim 7, wherein at least one of the amplifiers of the front-end module receiving the signals of two frequency bands is a wideband amplifier.

10. The wireless communication terminal according to claim 7 wherein the signal processor and control circuit are configured to pass the signals of one of the first or second frequency bands via a power amplifier of the front-end module of the other frequency band and the power amplifier of the front-end module of the frequency band of said signals is disconnected, if there is no conflict or if the power amplifier has a sufficient bandwidth.

11. The wireless communication terminal according to claim 7, wherein the signal processor and control circuit are further configured to select the control data from among data on the power transmitted or TPC (Transmit Power Control) and/or data on the quality of services QoS (Quality of Services).

12. The wireless communication terminal according to claim 7, wherein the first frequency band is a 5 Gigahertz (GHz) frequency band and the second frequency band is a 2.4 GHz frequency band.

13. The wireless communication terminal according to claim 7, wherein the signals of a 2.4 Gigahertz (GHz) frequency band are transmitted via at least one of the power amplifiers of the front-end module of a 5 GHz frequency band.

14. The wireless communication terminal according to claim 7, wherein the first and second circuits are Multiple Input Multiple Output (MIMO) circuits.

* * * * *